United States Patent [19]

Cairns et al.

[11] 3,879,411
[45] Apr. 22, 1975

[54] DITETRAZOLYL-BENZODIPYRANS

[75] Inventors: Hugh Cairns, Loughborough; Robert Minshull, Sandbach, both of England

[73] Assignee: Fisons Limited, London, England

[22] Filed: July 24, 1972

[21] Appl. No.: 274,204

[30] Foreign Application Priority Data
July 23, 1971 United Kingdom............... 34575/71

[52] U.S. Cl...... 260/308 D; 260/244 R; 260/250 R; 260/294.8 B; 260/294.8 C; 260/294.9; 260/295 T; 260/295 F; 260/296 T; 260/296 B; 260/345.2; 424/248; 424/250; 424/263; 424/269
[51] Int. Cl............................................ C07d 99/04
[58] Field of Search................................. 260/308 D

[56] References Cited
UNITED STATES PATENTS
3,706,768   12/1972   Bays............................... 260/308 D OTHER PUBLICATIONS
Cairns et al., Chem. Abstracts, Vol. 72, Abstract No. 43,635q (1970) QD1A51.
Buchanan et al., J. Med. Chem., Vol. 12, pages 1001-1006 (1969) RS1J5.
Juby et al. I, J. Med. Chem., Vol. 11, pages 111-117 (1968) RS1J5.
Juby et al. II, J. Med. Chem., Vol. 12, pages 396-401 RS1J5.

*Primary Examiner*—Alton D. Rollins
*Attorney, Agent, or Firm*—Wenderoth, Lind & Ponack

[57] ABSTRACT

There are described compounds of formula I,

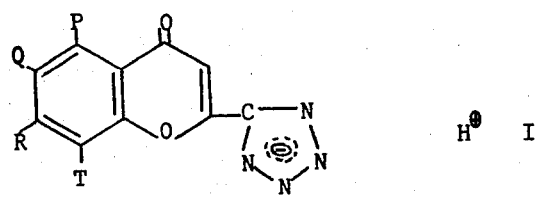

in which one or more adjacent pairs of P, Q, R and T may represent a chain

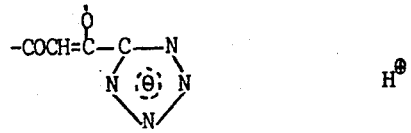

and the remainder of P, Q, R and T may represent a variety of groups. The compounds are indicated for use in the treatment of asthma.

3 Claims, No Drawings

DITETRAZOLYL-BENZODIPYRANS

This invention relates to new compounds, processes for their production and compositions containing them.

According to our invention we provide compounds of formula I,

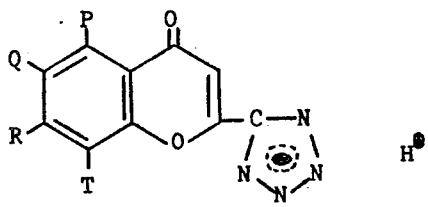

I in which one or more adjacent pairs of P, Q, R and T may represent a chain

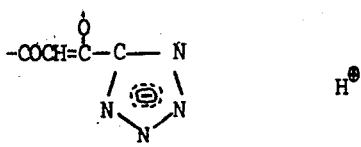

and the remainder of P, Q, R and T are the same or different and each is hydrogen; lower alkyl;

lower alkyl carrying a halo; hydroxy; lower alkoxy; acetoxy; carboxy; amino; lower alkylamino; lower dialkylamino; or a hydroxylamino substituent group;

unsaturated lower alkyl; phenyl lower alkyl; halophenyl lower alkyl; lower alkylphenyl lower alkyl; phenyl; naphthyl;

phenyl and naphthyl carrying a halo, lower alkyl, nitro carboxy or hydroxy substituent group;

pyridyl; furyl; pyrrolyl; cycloalkyl containing from 4–6 carbon atoms;

cycloalkyl containing from 4–6 carbon atoms and carrying a hydroxyl, lower alkoxy or carboxy substituent group;

nitrile; nitro; nitroso; hydroxy; lower alkoxy;

lower alkoxy carrying a hydroxy, lower alkoxy, carboxy, halo, amino, lower alkylamino, or di-lower alkylamino substituent group;

lower alkenyloxy or lower alkynyloxy; benzyloxy; phenyloxy; naphthyloxy; pyridyloxy; cyclohexyloxy; cyclopentyloxy; epoxy lower alkoxy; amino; lower alkylamino; lower dialkylamino; cycloalkylamino containing from 4 to 6 carbon atoms; phenylamino; naphthylamino; diphenylamino; halo-lower-alkylamino; lower alkenylamino; amino lower alkylamino; hydroxy amino; lower acyl amino; ureyl; thioureyl; guanidino; thiol; lower alkyl thiol; phenyl thiol; sulphonic acid; halogen, or one or more of P, Q, R and T maay be a group OY wherein Y is lower alkyl group substituted by lower alkyl or phenyl-lower alkyl in which one or more of the $CH_2$ groups has been replaced by oxygen, sulphur or carbonyl, which alkyl or phenyl-lower alkyl may carry one or more hydroxyl or carboxyl substituent groups; or an adjacent pair of P, Q, R and T (together with the adjacent carbon atoms in the benzene ring) together form a benzene ring, or a chain $—(CH_2)_3—$, $—O(CH_2)_3—$, $—O(CH_2)_2—$, $—C(CH_3)=CH—CO—O—$, $—O(CH_2)_2O—$, $—CH_2—CH(CH_3)—O—$, $—CH=CH—O—$, $—CH=C(CH_3)—O—$, $—OCH_2O—$, $—N-H—C(R^4R^5)—CH_2O—$, $—NR^5CH=CH—O—$ or $—NR^4CH=CH—NR^4—$ (wherein $R^4$ is hydrogen or lower alkyl or lower alkoxy and $R^5$ is hydrogen, or $R^4$ and $R^5$ together form a $=O$ group), and pharmaceutically acceptable derivatives thereof.

According to our invention we provide a process for the production of a compound of formula I, or a pharmaceutically acceptable derivative thereof, which comprises reacting a compound of formula II,

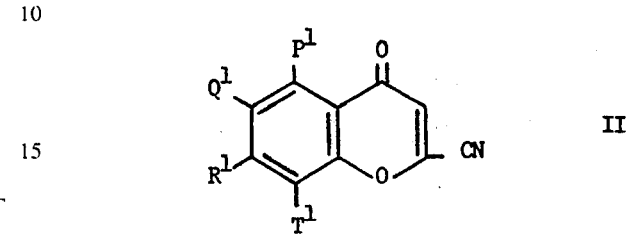

in which $P^1$, $Q^1$, $R^1$ and $T^1$ have the same significances as P, Q, R and T above, save that one or more adjacent pairs of $P^1$, $Q^1$, $R^1$ and $T^1$ may represent a chain $—COCH=C(E)—O—$, and E represents a group —CN or $—CN_4H$, with an azide in a solvent which is inert under the reaction conditions, and where desired or necessary converting the compound of formula I to a pharmaceutically acceptable derivative thereof.

Suitable solvents which are inert under the reaction conditions of process (a) include those in which both the reagents are soluble, e.g. N,N-dimethylformamide. Other solvents which may be mentioned include dimethylsulphoxide, tetrahydrofuran, diethyl glycol and ethyl methyl glycol. The reaction is preferably carried out at a temperature of from about 20° to 130°C for from about 1 to 20 hours. The azide used in the reaction is preferably ammonium or an alkali metal azide, e.g., sodium or lithium azide, but other azides, e.g., aluminium azide or the azides of nitrogen containing bases, e.g. mono-, di-, tri-, and tetramethylammonium, anilinium, morpholinium and piperdinium azides, may also be used if desired. Where an azide other than that of an alkali metal is used this azide may be prepared in the reaction mixture by double decomposition. The reaction may, if desired, be carried out in the presence of an electron acceptor, e.g. aluminium chloride, boron trifluoride, ethyl sulphonic acid or benzene sulphonic acid. As an alternative to the reaction conditions set out above the reaction may be carried out using hydrazoic acid (hydrogen azide) at a temperature of from about 20° to 150°C in a suitable solvent, under greater than atmospheric pressure. when an azide other than hydrazoic acid is used, e.g., sodium azide, the product of the reaction will be the corresponding salt. This salt may readily be converted to the free acid by treatment with strong acid, e.g., hydrochloric acid. The reaction is believed to pass through a compound of formula IV as an intermediate.

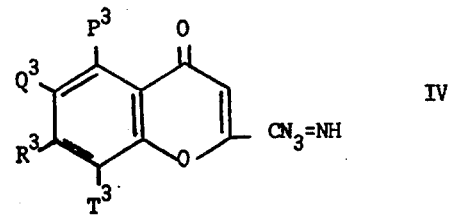

in which $P^3$, $Q^3$, $R^3$ and $T^3$ have the same significances as P, Q, R and T above, save that one or more adjacent pairs of $P^3$, $Q^3$, $R^3$ and $T^3$ may represent a chain —COCH=C($CN_3$=NH)—O—.

The compounds of formula II may be made by dehydrating a corresponding compound of formula III,

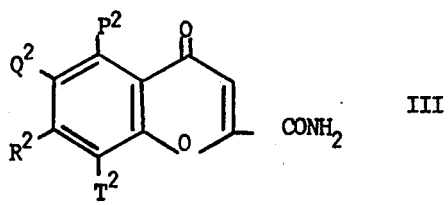

in which $P^2$, $Q^2$, $R^2$ and $T^2$ have the same significances as P, Q, R and T above save that one or more adjacent pairs of $P^2$, $Q^2$, $R^2$ and $T^2$ may represent a chain —COCH=C(G)—O—, and G represents a group —$CN_4H$, —$CONH_2$ or —CN.

The reaction is preferably carried out using at least two molar equivalents of a dehydrating agent, e.g., $POCl_3$, per mole of compound of formula III. Where the dehydrating agent reacts with one of $P^2$, $Q^2$, $R^2$, or $T^2$ (e.g., with a group comprising an —OH group) sufficient dehydrating agent should be used to satisfy the side reaction as well as the main reaction, or the reactive group should be protected. The reaction may, if desired, be carried out in the presence of an acid binding agent, e.g., triethylamine. The reaction may be carried out in the presence of a solvent, e.g., N,N-dimethylformamide, dimethyl sulphoxide, pyridine, benzene or hexamethyl phosphoramide, or an excess of the dehydrating agent may be used as the reaction medium. The reaction may be carried out at a temperature of from about 0° to 200°C depending on the dehydrating agent used. When phosphorus oxychloride is used a temperature of from 0° to 100°C is preferred.

The compounds of formula III may be made in conventional manner known per se from the corresponding carboxylic acid ester, e.g., by reaction of the ester with ammonia in an alkanol solvent at a temperature of 0° to 120°C.

The starting materials for the above process are either known compounds or may be made from known compounds using known techniques.

Some of the groups P, Q, R and T may be affected by the reaction conditions (either in the final steps or production of intermediates) described above. It is therefore contemplated that where necessary or desirable the reactions be carried out using protected derivatives of the reagents. Thus when free —OH groups are present they may be protected, for example by acylation and the protecting group removed subsequently e.g., by hydrolysis.

It will be appreciated that while the unsubstituted tetrazole groups have been represented above in a delocalised form other representations of the same group are also commonly used.

The compounds of formula I and the intermediates therefor may be recovered from their reaction mixtures using conventional methods.

The process described above may produce the compound of formula I or a derivative thereof. It is also within the scope of this invention to treat any derivative so produced to liberate the free compound of formula I, or to convert one derivative into another. Pharmaceutically acceptable derivatives include salts and notably water soluble salts having suitable cations. Salts which may be mentioned include basic addition salts, e.g., ammonium salts, amine salts, alkali-metal and alkaline-earth metal salts, notably the sodium salt.

According to a further feature of our invention we provide a process for the production of a pharmaceutically acceptable salt of a compound of formula I, which comprise treating a compound of formula I or another salt thereof with an appropriate base or salt containing an available pharmaceutically acceptable cation.

The compounds of formula I and pharmaceutically acceptable derivatives thereof are useful because they possess pharmacological activity in animals; in particular they are useful because they inhibit the release and/or action of pharmacological mediators which result from the in vivo combination of certain types of antibody and specific antigen, e.g., the combination of reaginic antibody with specific antigen (see Example A). In man, both subjective and objective changes which result from the inhalation of specific antigen by sensitised subjects are inhibited by prior administration of the new compounds. Thus the new compounds are useful in the treatment of asthma, e.g., allergic asthma. The new compounds are also useful in the treatment of so-called 'intrinsic' asthma (in which no sensitivity to extrinsic antigen can be demonstrated). The new compounds are also of value in the treatment of other conditions in which antigen-antibody reactions are responsible for disease, for example, hay fever and urticaria.

For the above mentioned uses the dosage administered will, of course, vary with the compound employed, the mode of administration and the treatment desired. However, in general, satisfactory results are obtained when the compounds are administered at a dosage of from 0.1 to 50 mg per kg of animal body weight in the test set out in Example A. For man the total daily dosage is in the range of from about 1 mg to 3,500 mg, preferably 5 mg to 1,500 mg, more preferably 10 mg to 1,000 mg, which may be administered in divided doses from 1 to 6 times a day or in sustained release form. Thus dosage forms suitable for administration (by inhalation or oesophageally) comprise from about 0.17 mg to 600 mg of the compound admixed with a solid or liquid pharmaceutically acceptable diluent or carrier. The compounds of formula I and pharmaceutically acceptable derivatives thereof may be administered by conventional techniques, preferably in admixture with a major proportion of a pharmaceutically acceptable adjuvant, diluent or carrier. Specifically the compounds may be administered by inhalation as a liquid or powder composition, e.g., a powder composition containing a diluent such as lactose, and optionally in combination with a bronchodilator, e.g., isoprenaline, or oesophageally as a tablet or capsule.

For administration by inhalation we prefer to use a powder comprising particles of the compound of formula I, or a pharmaceutically acceptable derivative thereof, having an effective particle size in the range of 0.01 to 10 microns, preferably in combination with a coarse carrier, e.g., having an effective particle size in the range 30 to 80 microns.

In this specification and in the claims the term 'lower' is used to indicate a group containing up to 10 carbon atoms.

As a specific group of compounds of formula I we provide those compounds in which those of P, Q, R and T which do not form a chain —COCH=C(CN$_4$.H)—O—, are each hydrogen, lower alkyl, lower alkenyl, phenyl, nitro, hydroxy, lower alkoxy, lower alkoxy substituted by a hydroxy or lower alkoxy group, lower alkenyloxy, benzyloxy, amino, or halogen.

Specific examples of P, Q, R and T which may be mentioned include hydrogen, methyl, ethyl, butyl, pentyl, and hexyl;

lower alkyl substituted by a methoxy, ethoxy, propoxy, pentoxy, ethylamino, butylamino, pentylamino, dimethylamino, diethylamino, dibutylamino, or dipentylamino group;

alkenyl such as allyl or propargyl; benzyl; phenylethyl; cyclopentyl; cyclohexyl; methoxy; ethoxy; propoxy; ethylamino; propylamino; dimethylamino; diethylamino; chlorine; bromine or iodine.

The invention is illustrated, but in no way limited by the following Examples.

EXAMPLE 1

4,10-Dioxo-2,8-ditetrazol-5'-yl-5-methoxy-4H,1OH-benzo(1,2-b:3,4-b')dipyran a. 4,10-Dioxo-5-methoxy-4H,1OH-benzo(1,2-b:3,4-b')dipyran-2,8-dicarboxamide 0.88 Ammonium hydroxide solution (20ml.) was added dropwise to a stirred solution of diethyl 4,10-dioxo-5-methoxy-4H,1OH-benzo(1,2-b:3,4-b')dipyran-2,8-dicarboxylate (5gm.) in a mixture of chloroform (100ml.) and N,N-dimethylformamide (75ml.). The resulting solution was stirred at room temperature for 1 hour whilst a solid precipitated. The reaction mixture was filtered, the residue washed with water and then dried to give 4,10-dioxo-5-methoxy-4H-1OH-benzo(1,2-b:3,4-b') dipyran-2,8-dicarboxamide (4.2gm.) as a pale yellow solid, m.pt. >300°.

b. 4,10-Dioxo-5-methoxy-4H,1OH-benzo(1,2-b:3,4-b')dipyran-2,8-dicarbonitrile

To N,N-dimethylformamide (20ml.) was slowly added phosphorus oxychloride (2ml.) with stirring and ice-cooling. Then in small quantities, 4,10-dioxo-5-methoxy-4H,1OH-benzo(1,2-b:3,4-b')dipyran-2,8-dicarboxamide (10gm.) was added to this solution and the mixture stirred at room temperature for 2 hours. The resulting solution was poured into cold water (200ml.) and the precipitated solid isolated, washed with water and dried to give 4,10-dioxo-5-methoxy-4H,1OH-benzo(1,2-b:3,4-b')dipyran-2,8-dicarbonitrile (0.7gm.). Crystallisation from N,N-dimethylformamide gave a buff coloured solid m.pt. 287°C.

c. 4,10-Dioxo-2,8-ditetrazol-5'-yl-5-methoxy-4H,1OH-benzo(1,2-b:3,4-b')dipyran

A mixture of 4,10-dioxo-5-methoxy-4H,1OH-benzo(1,2-b:3,4-b')-dipyran-2,8-dicarbonitrile (5.0gm.), sodium azide (3.3gm.) ammonium chloride (2.7gm.) and N,N-dimethylformamide (100ml.) was stirred at 70°C for 3 hours. The solvent was then removed in vacuo and water (300ml.) was added to the residue. The mixture was filtered and the filtrate acidified with 2N hydrochloric acid to give a gel-like precipitate. This was isolated and triturated with ethanol and ether to give 4,10-dioxo-2,8-ditetrazol-5'-yl-5-methoxy-4H,1OH-benzo(1,2-b:3,4-b')dipyran (4.7gm.) as a pale-grey solid.

Spectral Confirmation

The i.r. spectrum (nujol mull) contained a band at 1,670cm$^{-1}$ due to the benzopyran ring carbonyl groups.

The n.m.r. spectrum included a peak at 3.25$\tau$ due to the protons of the two N—H groups. Singlets at 3.15 and 3.20 were attributed to the 3- and 9-protons of the benzopyran rings and a singlet at 2.99$\tau$ to the aromatic proton (solvent: dimethylsulphoxide — d$_6$).

d. Disodium 4,10-dioxo-2,8-ditetrazl-5'-yl-5-methoxy-4H,1OH-benzo(1,2-b:3,4-b')dipyran 4,10-Dioxo-2,8-ditetrazol-5'-yl-5-methoxy-4H,1OH-benzo(1,2-b:3,4-b')dipyran (5.0gm.) was added to a solution of sodium hydrogen carbonate (1.75gm.) in water (125ml.). The mixture was heated to 50°C until the bulk of the tetrazole had dissolved and then filtered. Water was removed from the resulting filtrate by azeotropic distillation with iso-propyl alcohol, until a solid began to precipitate. Addition of iso-propyl alcohol was ceased and the resulting solution allowed to cool. After cooling, the precipitated solid was isolated and further purified by dissolving in water (125ml.) and repeating the above azeotropic distillation with iso-propyl alcohol giving disodium 4,10-dioxo-2,8-ditetrazol-5'-yl-5-methoxy-4H,1OH-benzo(1,2-b: 3,4-b')dipyran tetrahydrate (2.2gm.) as a pale yellow solid, m.pt. >300°.

Analysis:
Found: C, 36.6; H, 3.0; N, 22.9%
C$_{15}$H$_6$N$_8$O$_5$Na$_2$, 4H$_2$O requires: C, 36.3; H, 2.8; N, 22.6%

EXAMPLE 2

4,6-Dioxo-2,8-ditetrazol-5'-yl-10-ethyl-4H,6H-benzo(1,2-b:5,4-b')dipyran a. 4,6-Dioxo-10-ethyl-4H,6H-benzo(1,2-b:5,4-b')dipyran-2,8-dicarboxamide A suspension of diethyl 4,6-dioxo-10-ethyl-4H,6H-benzo(1,2-b:5,4-b')dipyran-2,8-dicarboxylate (105gm.) in N,N-dimethylformamide (1,050ml.) and 0.88 ammonium hydroxide solution (1,050ml.) was stirred at room temperature for 8¼ hours. The resulting reaction mixture was filtered, the residue washed with water and then dried to give a yellow solid (77.5gm.).

70gm. of this product was washed with hot N,N-dimethylformamide to give 4,6-dioxo 10-ethyl-4H,6H-benzo(1,2-b:5,4-b')dipyran-2,8-dicarboxamide (54gm.) as a pale green solid m.pt. >300°C.

Analysis:
Found: C, 58.2; H, 3.8; N, 8.7%
C$_{16}$H$_{12}$O$_6$N$_2$ requires: C, 58.5; H, 3.77; N, 8.5% b. 4,6-Dioxo-10-ethyl-4H,6H-benzo(1,2-b:5,4-b')dipyran-2,8-dicarbonitrile

To N,N-dimethylformamide (225ml.) was slowly added phosphorus oxychloride (13ml.) with stirring and ice-cooling. Then, in small quantities, 4,6-dioxo-10-ethyl-4H,6H-benzo(1,2-b:5,4-b') dipyran-2,8-dicarboxamide (15gm.) was added to the solution and the mixture stirred at 45°C for 46⅔ hours. The reaction mixture was then cooled and filtered. The residue was washed with water and then dried to give a pink crystalline solid (9.1gm.). Crystallisation of this product, firstly from chloroform and then from N,N-dimethylformamide gave 4,6-dioxo-10-ethyl-4H,6H-benzo(1,2-b:5,4-b')dipyran-2,8-dicarbonitrile (5.2gm.) as a buff crystalline solid, m.t. 278°–281°C.

Analysis:
Found: C, 65.5; H, 3.0; N, 9.4%
$C_{16}H_8N_2O_4$ requires: C, 65.8; H, 2.8; N, 9.6% c. 4,6-Dioxo-2,8-ditetrazol-5'-yl-10-ethyl-4H,6H-benzo(1,2-b:5,4-b')dipyran

A mixture of 4,6-dioxo-10-ethyl-4H,6H-benzo(1,2-b:5,4-b') dipyran-2,8-dicarbonitrile (4.31gm.) sodium azide (2.56gm.), ammonium chloride (2.09gm.) and N,N-dimethylformamide (300ml.) was stirred whilst its temperature was raised to 60°C over 2 hours. The mixture was held at this temperature for a further 2½ hours before being cooled and added to water (400ml.). The resulting solution was acidified with hydrochloric acid and the suspension thus produced was filtered. The residue was washed with water and dried to give a cream coloured solid (5.17gm.). Two crystallisations of this product from N,N-dimethylformamide gave 4,6-dioxo-2,8-ditetrazol-5'-yl-10-ethyl-4H,6H-benzo(1,2-b: 5,4-b')dipyran (3.99gm.) as a cream coloured, crystalline solid.

Spectral Confirmation

The i.r. spectrum (nujol mull) contained a band at 1,670cm$^{-1}$ due to the benzopyran ring carbonyl groups. A broad n.m.r. signal centred at 3.25 was assigned to the two N—H protons. A singlet at 2.98 was attributed to the 3- and 7- protons of the benzopyran rings and a singlet at 1.58 to the aromatic proton (solvent: dimethylsulphoxide — $d_6$).

d. Disodium 4,6-dioxo-2,8-ditetrazol-5'-yl-10-ethyl-4H,6H-benzo (1,2-b:5,4-b')dipyran 4,6-Dioxo-2,8-ditetrazol-5'-yl-10-ethyl-4H,6H-benzo(1,2-b: 5,4-b')dipyran (0.65gm.) was dissolved with warming, in a solution of sodium hydrogen carbonate (0.26gm.) in water (15ml.). The resulting solution was charcoaled and then the water azeotroped using iso-propyl alcohol until a solid was precipitated. The precipitate was isolated and dried to give a yellow solid (0.26gm.). This was further purified by adding to water (5ml.), and the water again azeotroped from the resulting solution, using iso-propyl alcohol, giving 4,6-dioxo-2,8-ditetrazol5'-yl-10-ethyl-4H,6H-benzo(1,2-b:5,4-b')dipyran trihydrate (0.053precipitated. as a pale yellow solid.

Analysis:
Found: C, 39.8; H, 3.2; N, 23.6%
$C_{16}H_8N_8O_4Na_2$, 3 $H_2O$ requires: C, 40.3; H, 2.9; N, 23.6%

EXAMPLE A

The procedure set out below may be used to assess the effectiveness of a compound in inhibiting the release of the pharmacological mediators of anaphylaxis.

In this test, the effectiveness of the compounds in inhibiting the passive cutaneous anaphylactic reaction in rats is assessed. It has been proved that this form of test gives reliable qualitative indications of the ability of the compounds under test to inhibit antibody-antigen reactions in man.

In this test method Charles River France/Fisons bred rats (male or female) having a body weight of from 100 to 150 gms are infected subcutaneously at weekly intervals with *N. brasiliensis* larvae in doses increasing from about 2,000 larvae per animal to 1,2000 larvae per animal in order to establish the infection. After 8 weeks the rats are bled by heart puncture and 15–20 mls. of blood collected from each animal. The blood samples are then centrifuged at 3,500 rpm. for 30 minutes in order to remove the blood cells from the blood plasma. The serum is collected and used to provide a serum containing *N brasiliensis* antibody. A pilot sensitivity test is carried out to determine the least quantity of serum required to give a skin weal in control animals in the test described below of 2 cm diameter. It has been found that optimum sensitivity of rats in the body weight range 100–130 gms is obtained using a serum diluted with eight parts of physiological saline solution. This diluted solution is called antibody serum A.

The antigen to react with the antibody in serum A is prepared by removing *N. brasiliensis* worms from the gut of the infested rats, centrifuging the homogenate and collecting the supernatent liquor. This liquor is diluted with saline to give a protein content of 1 mg/ml and is known as solution B.

Charles River France/Fisons bred rats in the body weight range 100 to 130 gms are sensitised by intradermal injection of 0.1 mls of serum A into the right flank. Sensitivity is allowed to develop for 24 hours and the rats are then injected intravenously with 1 ml/100 gms body weight of a mixture of solution B (0.25 mls), Evans Blue dye solution (0.25 mls) and the solution of the compound under test (0.5 mls varying percentages of active matter). Insoluble compounds are administered as a separate intraperitoneal injection 5 minutes before intravenous administration of solution B and Evans Blue dye. For each percentage level of active matter in the solution under test five rats are injected. Five rats are used as controls in each test. The dosages of the compound under test are selected so as to give a range of inhibition values.

Thirty minutes after injection of solution B the rats are killed and the skins removed and reversed. The intensity of the anaphylactic reaction is assessed by comparing the size of the characteristic blue weal produced by spread of the Evans Blue dye from the sensitisation site, with the size of the weal in the control animals. The size of the weal is rated as 0 (no weal detected, i.e., 100% inhibition) to 4 (no difference in size of weal, i.e., no inhibition) and the percentage inhibition for each dose level calculated as:

$$\% \text{ inhibition} = \frac{(\text{Control group score} - \text{treated group score}) \times 100}{\text{Control group score}}$$

The percentage inhibitions for the various dose levels are plotted graphically for each compound. From these graphs the dosage required to achieve a 50% inhibition of the anaphylactic reaction ($ID_{50}$) may be determined.

The compounds are also evaluated in the above manner using intestinal and gastric administration of the compound.

We claim:
1. A compound of formula I,

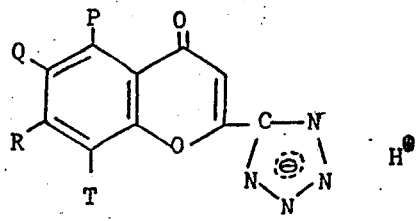

in which one adjacent pair of P, Q, R and T represents the chain

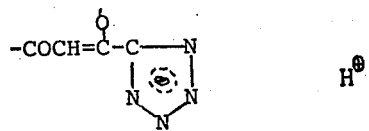

and the remainder of P, Q, R and T are the same or different and each is hydrogen; lower alkyl or lower alkoxy and pharmaceutically acceptable salts thereof.

2. A compound according to claim 1, which is 4,10-Dioxo-2,8-ditetrazol-5'-yl-5-methoxy-4H,10H-benzo(1,2-b:3,4-b')dipyran.

3. A compound according to claim 1, which is 4,6-Dioxo-2,8-ditetrazol-5'-yl-10-ethyl-4H,6H-benzo(1,2-b:5,4-b')dipyran.

* * * * *